(12) United States Patent
Leleve

(10) Patent No.: US 7,699,509 B2
(45) Date of Patent: Apr. 20, 2010

(54) FIXED LIGHT FOR BENDS FOR A MOTOR VEHICLE

(75) Inventor: Joël Leleve, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 12/044,703

(22) Filed: Mar. 7, 2008

(65) Prior Publication Data

US 2008/0151565 A1    Jun. 26, 2008

Related U.S. Application Data

(63) Continuation of application No. 10/894,619, filed on Jul. 20, 2004, now Pat. No. 7,390,112.

(30) Foreign Application Priority Data

Jul. 24, 2003    (FR)    .................................... 03 09093

(51) Int. Cl.
*B60Q 1/04* (2006.01)
(52) U.S. Cl. ........................ 362/464; 362/465; 362/545
(58) Field of Classification Search ................. 362/464, 362/465, 466, 543, 544, 545; 315/81, 82
See application file for complete search history.

(56) References Cited

U.S. PATENT DOCUMENTS

| 6,176,590 | B1 | 1/2001 | Prevost et al. |
| 6,476,726 | B1 | 11/2002 | Pederson |
| 6,481,876 | B2 | 11/2002 | Hayami et al. |
| 6,698,911 | B2 | 3/2004 | Naganawa et al. |
| 6,997,587 | B2 | 2/2006 | Albou |
| 2001/0026457 | A1 | 10/2001 | Oyama et al. |
| 2004/0156211 | A1 | 8/2004 | Blusseau |
| 2004/0240217 | A1 | 12/2004 | Rice |

FOREIGN PATENT DOCUMENTS

| DE | 19923198 | 11/2000 |
| EP | 0864462 | 9/1998 |
| FR | 2811621 | 1/2002 |
| GB | 178234 | 4/1922 |

OTHER PUBLICATIONS

French Search Report Apr. 19, 2004.

*Primary Examiner*—Y My Quach Lee
(74) *Attorney, Agent, or Firm*—Locke Lord Bissell & Liddell

(57) ABSTRACT

The fixed light for bends for a motor vehicle comprises at least two light sources, means sensitive to the path of the vehicle for supplying a signal dependent on the nature of the road followed by the vehicle, and means for controlling successive switching on the sources according to the signal delivered and providing an effect of light sweeping towards the inside of the bend. Each light source consists of one or more modules with light-emitting diodes.

20 Claims, 4 Drawing Sheets

FIXED LIGHT FOR BENDS FOR A MOTOR VEHICLE

This application is a continuation of prior application Ser. No. 10/894,619, filed Jul. 20, 2004, which is incorporated by reference herein in its entirety as if fully set forth herein and to which priority under 35 U.S.C. §120 is claimed. This application claims a benefit of priority under 35 U.S.C. §119 based on French Patent Application No. 03 09 093 filed Jul. 24, 2003, which is hereby incorporated by reference herein in its entirety as if fully set forth herein.

FIELD OF THE INVENTION

The invention relates to a fixed headlight for bends for a motor vehicle.

BACKGROUND OF THE INVENTION

Such a light is provided for illuminating as well as possible towards the inside of the bend the portions of road which the vehicle will approach.

EP-A-0 864 462 proposes a lighting system comprising at least two lights of the fog type and means for controlling the supply power to the lights according to vehicle wheel turning information. These control means increase the supply power of only one light for bends which is on the side toward which the vehicle is turned, so as to accentuate the illumination on this side. Proportionality to the bend is thus obtained by modulating the intensity of the beam; the effect perceived by the driver may be considered to be a moderate service.

In order to obtain a more satisfactory effect, it is possible to provide a following of the bend by rotational driving of an optical system, which involves moving parts, actuators and control electronics, and therefore a high cost.

The aim of the invention is above all to provide a fixed light for bends which, whilst remaining of an acceptable cost, makes it possible to obtain an effect of following the bend.

SUMMARY OF THE INVENTION

According to the invention, a fixed light for bends for motor vehicles is characterized in that it comprises:

at least two light sources;

means sensitive to the path of the vehicle in order to supply a signal depending on the nature of the road followed by the vehicle;

and means for controlling successive switching on of the sources according to the signal delivered and to provide an effect of light sweeping, preferably but not limitingly towards the inside of the bend;

each light source advantageously consists of a light-emitting diode module.

The light preferably comprises at least four light sources able to be switched on successively in order to provide travel of the light beam and following of the bend.

The preceding source, in the order of switching on, can remain on when the following source is switched on. In a variant, the preceding source is switched off (totally or partially) when the following source is switched on.

It may also be a case of a group of several, at least two, of these modules. In this case, it is possible to have several groups of modules, each diode in a group being in the same state (off or on) as the other diodes in the said group.

The beams of the light sources preferably have an inclination to the longitudinal axis of the vehicle and/or a beam angle which cross over, in the order of switching on, so that a following light source illuminates more towards the inside of a bend than the previous source.

The optical axes of the light sources can be oriented more and more towards the inside of the bend. In a variant, the optical axes of the sources are parallel to each other, whilst being oriented towards the inside of the bend.

The beam angle of the light beam of the sources can be greater and greater towards the inside of the bend in the order of switching on of the sources.

The switching on of each light-emitting diode can be provided by a transistor controlled by a control unit which receives the turning signal, in particular coming from a steering-wheel sensor.

Apart from the provisions disclosed above, a certain number of other provisions will be dealt with more explicitly below with regard to example embodiments described with reference to the accompanying drawings, but which are in no way limiting. In these drawings:

DESCRIPTION OF THE PREFERRED EMBODIMENTS

Figure 1:
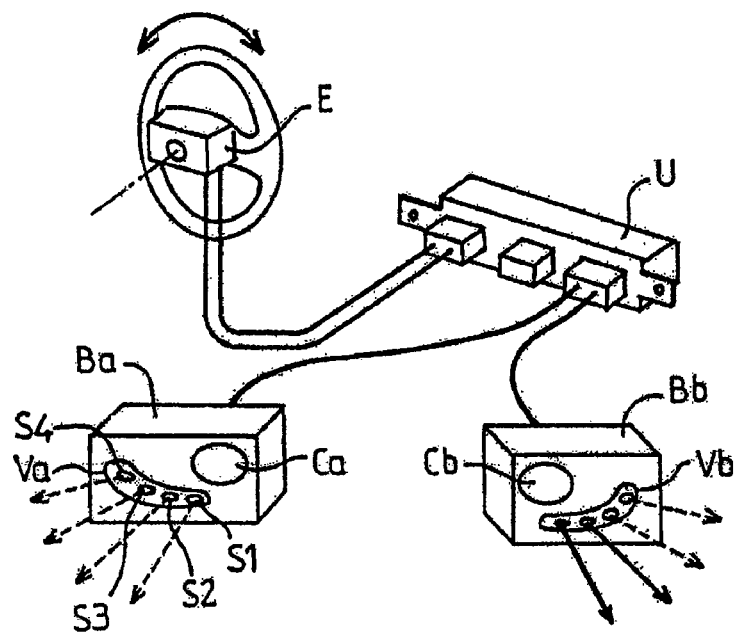
FIG. 1 is a diagram in perspective of a lighting installation on a vehicle comprising two fixed lights for bends according to the invention.

Referring to FIG. 1 of the drawings, part of a lighting installation can be seen, on a motor vehicle, which comprises on each side, at the front of the vehicle, a fixed light for bends Va situated to the right and Vb situated to the left. The light for bends can be housed in the same housing Ba, Bb as the corresponding dipped headlight Ca, Cb. Each housing is connected by a multiconductor cable to a control unit U.

Means sensitive to the path of the vehicle comprise a steering-wheel sensor E and supply to the unit U a signal depending on the nature of the road being followed by the vehicle.

Figure 2A:
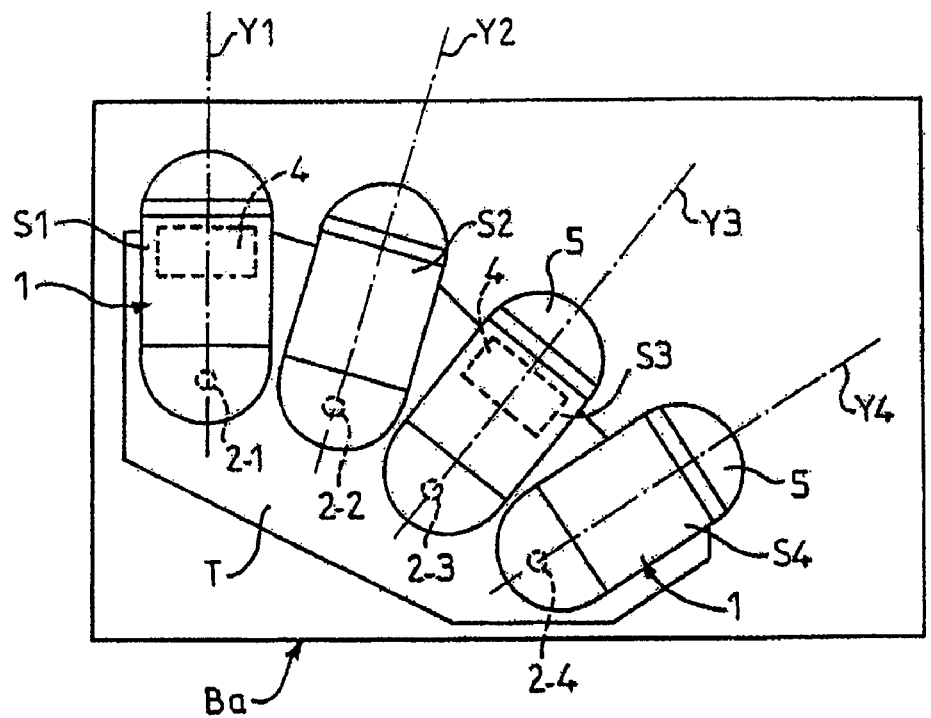
FIG. 2 is a schematic plan view to a larger scale of the light situated on the right-hand side of the vehicle.
Figure 2B:
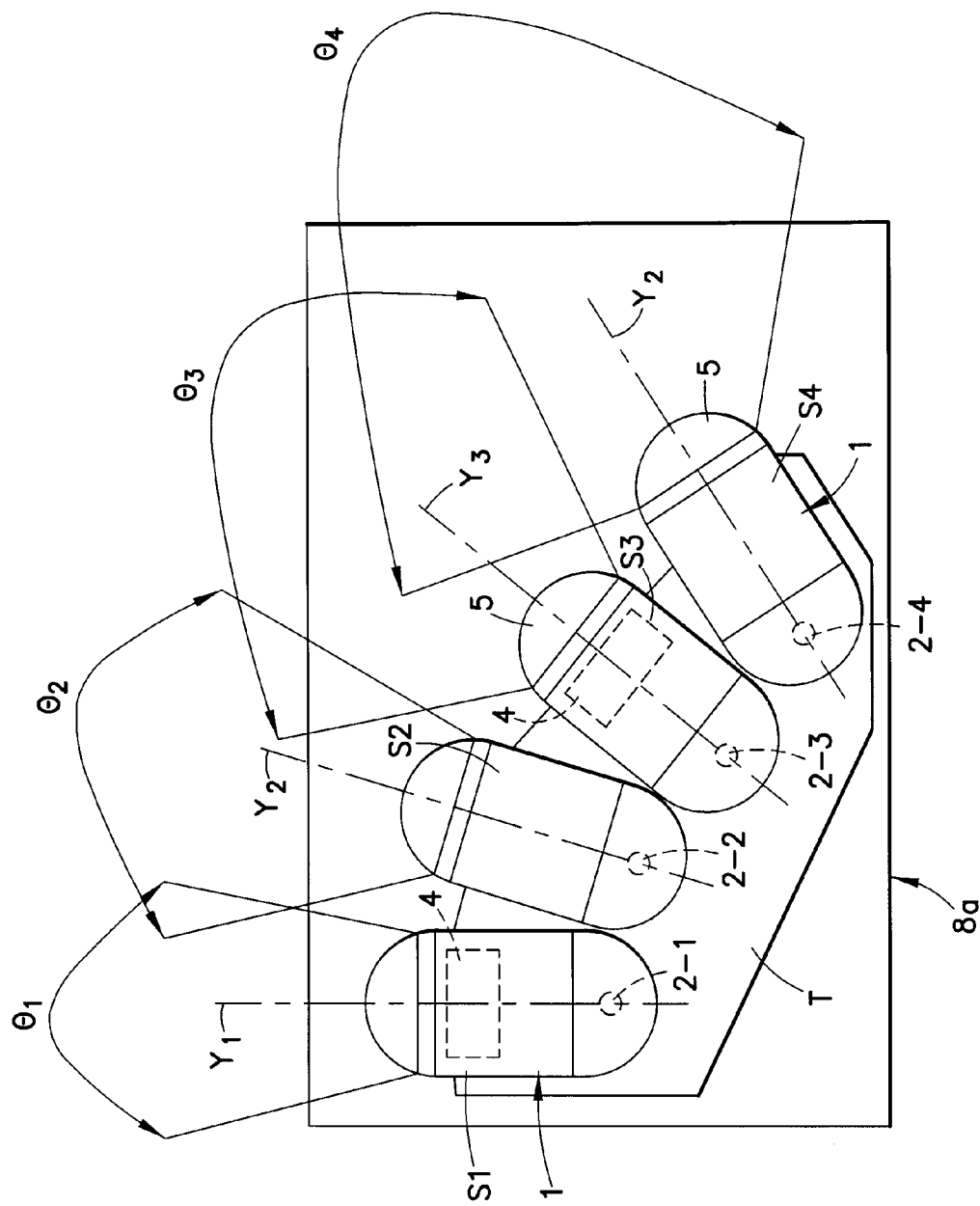

Each fixed light for bends Va, Vb comprises at least two and preferably four light sources S1, S2, S3, S4 shown diagrammatically in FIG. 2 for the light for bends Va.

Each light source advantageously consists of a module 1 (FIG. 3) with light-emitting diode 2. The light sources are mounted on a support T housed in the housing Ba. The light sources S1-S4 are mounted with a possibility of adjustment of their orientation.

Figure 3:
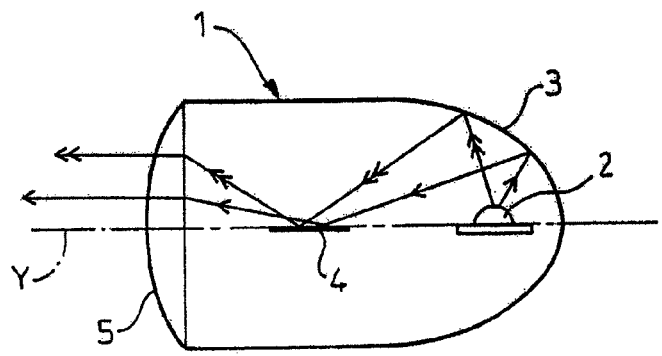
FIG. 3 is a schematic vertical section of an LED module.

Each module 1 comprises a semi-ellipsoidal reflector 3 of optical axis Y. An LED 2 is situated at the inner focus of the reflector 3 and is oriented so that the axis of its light beam is orthogonal to the optical axis Y-Y. The beam returned by the reflector 3 falls on a reflective metallic plate 4, generally referred to as a "folder", which can be flat as illustrated in FIG. 3, or bent in the form of a dihedron. The plate 4 is situated at the outer focus of the reflector 3, or close to it. A convergent lens 5 is placed at the exit from the module 1. According to the form of the folder 4, the module 1 can give a beam with a flat cutoff or a V-shaped cutoff. In the application in question, the light beam obtained is preferably with a flat cutoff, the illuminated part being situated below a horizontal line.

The unit U is designed to control progressive switching on of the sources S1-S4 according to the signal delivered by the steering-wheel sensor E and provide a light sweeping effect with travel of the light beam and following of the bend.

The source S1 situated to the left of the assembly illuminates less than the others to the right, that is to say towards the inside of a right-hand bend. S1 is switched on first, then the source S2, the source S3, the source S4. The preceding source in the order of switching on preferably remains switched on when the following one is switched on.

The optical axes Y1, Y2, Y3, Y4 of the light sources S1-S4 are oriented more and more towards the right, that is to say towards the inside of the right-hand bend.

In order to increase the scanning effect, the angular opening of the light beam supplied by each of the successive light sources S1-S4 can increase from S1 to S4. The beam angle of the beam of light source S4 can attain 40°.

Figure 4:
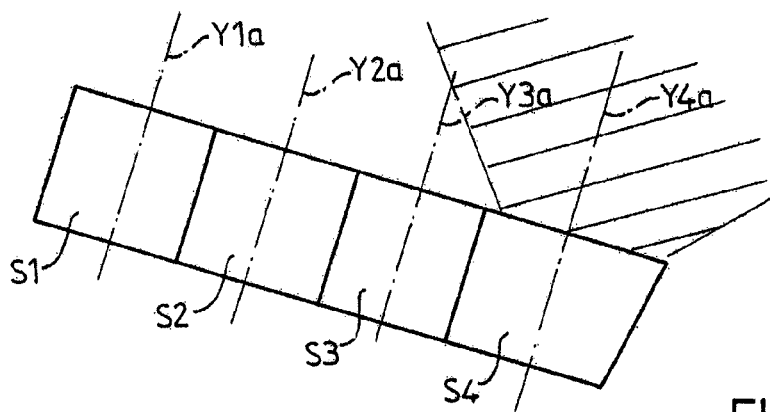
FIG. 4 is a diagram of a variant arrangement of the LED modules.

In a variant, as illustrated in FIG. 4, the optical axes Y1a-Y4a of the modules are parallel to each other but inclined to the right with respect to the longitudinal axis of the vehicle. In this case, preferably, the angular opening of the light beams increases from S1 towards S4.

Figure 6:
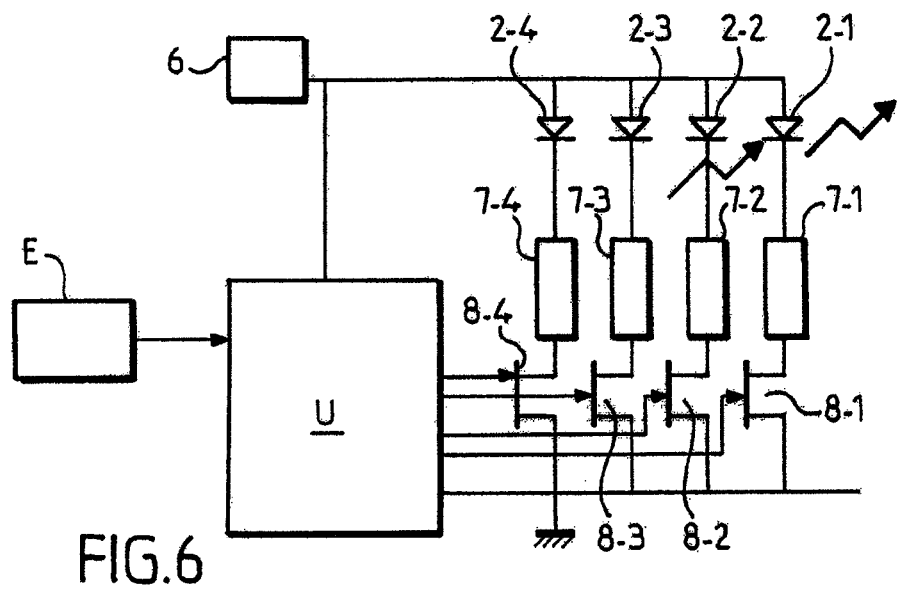
FIG. 6 is a diagram of a circuit controlling the light sources.

FIG. 6 illustrates a control diagram for the light-emitting diodes 2.1 to 2.4. The anodes of the diodes are connected in parallel to the +terminal of a DC voltage source 6, for example at 12 V. The cathodes of the diodes are connected by means of a ballast resistor 7.1 to 7.4 to an electrode of a power transistor 8.1 to 8.4, another electrode of which is connected to earth. The control electrode of the transistor is connected to an output of the control unit U, an input terminal of which receives the signal supplied by the steering-wheel sensor E.

The control unit U can receive the information signal on the path of the vehicle from means other than the steering-wheel sensor, for example from a GPS navigator or a camera analyzing the road in front of the vehicle, or other equivalent devices.

Figure 7:
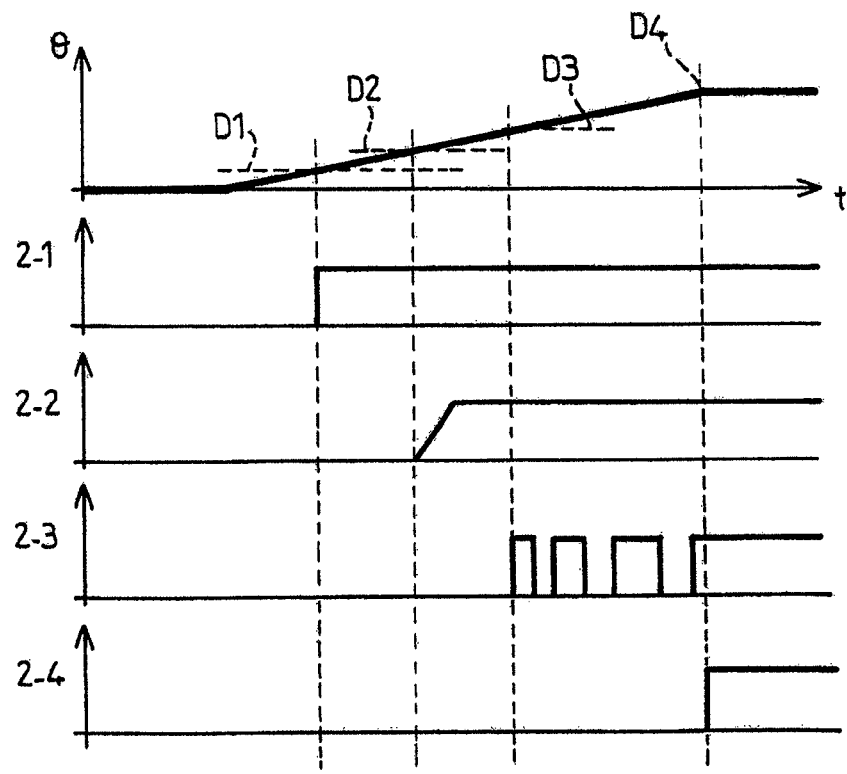
FIG. 7 is a diagram with several lines, illustrating various methods of controlling the switching on of the LEDs.

The power transistors 8.1 to 8.4 can be controlled in two-state mode as illustrated in FIG. 7 on the second and last line for the LEDs 2.1 and 2.4. In a variant, the power transistors are controlled in analogue or modulated voltage as described below with regard to the LEDs 2.2 and 2.3.

The first line of FIG. 7 illustrates the variation in the angle of rotation .theta. of the steering wheel entered on the Y axis as a function of the time t entered on the X axis, when the vehicle is going round the bend. The switching on of the first LED 2.1 is demanded when the turning angle reaches a first threshold D1. The second LED 2.2 is switched on when the turning angle reaches a second threshold D2. In the example in FIG. 7, the switching of the LED 2.2 is effected in accordance with an analogue linear modulation represented by an inclined ramp before reaching the maximum level.

The third LED 2.3 is switched on when the turning angle reaches a third threshold D3. In the example in FIG. 7, the switching on of this LED is effected in accordance with a pulse width modulation (PWM). The pulses become greater and greater in order to reach a maximum value corresponding to a continuous supply, according to the increase in the turning angle.

The last LED 2.4 is switched on in two-state mode when the turning angle reaches the maximum threshold D4.

Figure 5:
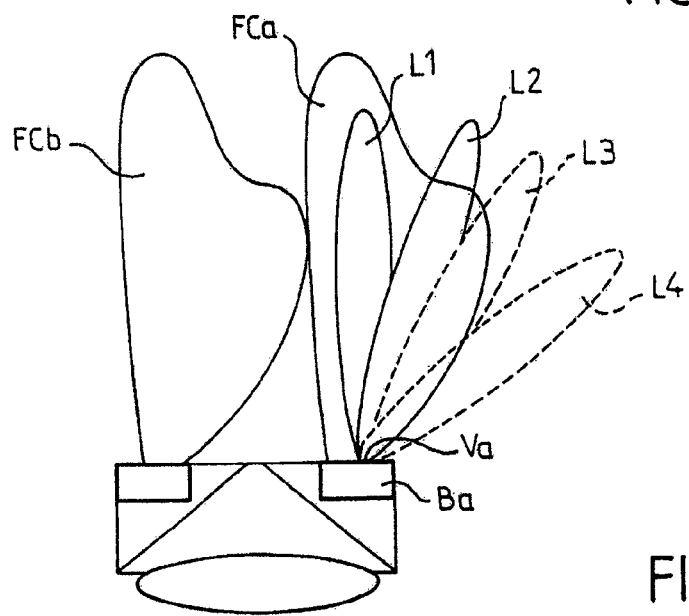
FIG. 5 is a schematic plan view of the front of the vehicle equipped with lights according to the invention.

The diagram of FIG. 5 illustrates the travel of the beam by modulation of each light source S1-S4.

The main dipped beams FCa, FCb are shown, the two dipped headlights being switched on.

When the vehicle goes round a bend to the right, the light source S1 is switched on first and produces a beam L1, for example with its axis parallel to that of the vehicle. Then, according to the turning angle, the successive light sources S2, S3, S4 are switched on, without switching off of the previous light sources, so that beams L2, L3, L4 are obtained which are more and more inclined towards the right, that is to say towards the inside of the bend.

The light sources of the fixed light for bends situated on the left remain switched off during a bend to the right. During a bend to the left, the left-hand fixed light for bends is switched on, whilst the right-hand fixed light for bends remains switched off.

The progressive switching on of the light-emitting diodes 2.1-2.4, according to the angle of the steering wheel, gives a sweep effect equivalent to a beam rotation, without for all that using any moving mechanical parts.

Although the number of four light sources is advantageous for producing a spectacular sweep effect, without giving rise to an excessive increase in the cost price, it is possible to reduce the cost by being limited to two light sources whose successive switching on does create a sweeping effect.

The light-emitting diodes allow a modulation of light intensity without substantial shift in the color of the light, unlike a modulated halogen lamp, which emits a light which appears more and more white when the supply voltage increases.

Such a halogen lamp, combined with a discharge lamp producing a bluish-white light, seems to become reddish when its supply voltage increases.

What is claimed is:

1. A fixed light for a motor vehicle, which comprises:
   at least two light sources, each light source consisting of at least one module with a light-emitting diode;
   means sensitive to a path of the vehicle for supplying a signal dependent on the path followed by the vehicle; and
   means for controlling successive switching on of the sources according to the signal delivered and for providing a light sweeping effect, and
   wherein each of the light sources is adapted to emit a light beam having a predetermined angular opening, and
   wherein the angular opening of the successive light beam increases as a function of the order of switching on of the light sources.

2. A light according to claim 1, which comprises at least four light sources able to be switched on successively in order to provide travel of the light beam and following of a bend.

3. A light according to claim 1, wherein a one of the light sources remains switched on when another of the light sources, in the order of switching on, is switched on.

4. A light according to claim 1, wherein the light beams emitted from each one of the light sources collectively define a light beam axis for that one of the light sources, and each of the light beam axes defines an angle with a longitudinal axis of the vehicle which increases as a function of the order of switching on, whereby illumination by the light beams increases towards an inside of a bend than a previous one of the light sources in the order of switching on.

5. A light according to claim 4, wherein the light beam axes are parallel to each other, whilst being oriented towards the inside of the bend.

6. A light according to claim 1, wherein a beam angle of the light beam of the sources is greater towards an inside of a bend in accordance with the order of switching on of the sources.

7. A light according to claim 1, wherein the switching on of each light-emitting diode is provided by a transistor controlled by the means for controlling which receives the signal.

8. A light according to claim 7, further comprising a steering wheel sensor that provides the signal to the means for controlling.

9. A light according to claim 1, wherein a sweeping effect produced by successive switching on of the light sources is towards a inside of a bend.

10. A motor vehicle equipped with at least one light according to claim 1.

11. A light according to claim 1, wherein the angular opening of a first one of the individual light beams is less than the angular opening of a second one of the individual light beams, and the light sources are switched on to produce the first one of the individual light beams and then to produce the second one of the individual light beams.

12. A motor vehicle light adapted to produce a plurality of light beams, each light beam having a predetermined angular opening, and to give a sweeping effect without moving mechanical parts, the light comprising:
a housing;
a plurality of light-emitting diodes fixed in the housing, each of the light-emitting diodes being a light source for one of the light beams;
a vehicle path sensor; and
a controller adapted to control switching on of the light-emitting diodes according to a signal from the vehicle path sensor and when the motor vehicle is turning the controller switches on the light-emitting diodes so that the angular opening of the successive light beams increases.

13. A light according to claim 12, in which the vehicle path sensor is selected from the group consisting of: a steering-wheel sensor, a GPS navigator and a camera analyzing the road in front of the vehicle.

14. A light according to claim 12, in which each of the light-emitting diodes defines a light beam axis, and the controller is adapted to switch on the light-emitting diodes when the vehicle is turning so that the light beam axes of the individual light-emitting diodes are increasingly inclined with respect to a longitudinal axis of the vehicle as a function of the order of switching on.

15. A light according to claim 12, in which the light-emitting diodes have parallel light beam axes.

16. A motor vehicle light that gives a sweep effect without moving mechanical parts, the light being adapted to produce a plurality of light beams, each light beam having a predetermined angular opening and comprising:
a housing;
a plurality of light-emitting diodes fixed in the housing, each of the light-emitting diodes being a light source for one of the light beams;
a vehicle path sensor; and
a controller adapted to control switching on of the light-emitting diodes according to a signal from the vehicle path sensor and when the motor vehicle is turning the controller switches on the light-emitting diodes so that angular opening of the following light beam produced by the light-emitting diodes increases,
in which the light-emitting diodes have an anode and a cathode, the anodes of the light-emitting diodes being electrically connected in parallel to a terminal of a DC voltage source and the cathodes of the light-emitting diodes being electrically connected to an electrode of a power transistor, and a control electrode of the power transistor is connected to the controller.

17. A light according to claim 16, in which at least one of the power transistors is controlled in a two-state mode in accordance with the signal from the vehicle path sensor.

18. A light according to claim 16, in which at least one of the power transistors is controlled in an analog linear modulation mode in accordance with the signal from the vehicle path sensor.

19. A light according to claim 16, in which at least one the power transistors is controlled in a pulse width modulation mode in accordance with the signal from the vehicle path sensor.

20. A motor vehicle comprising:
right and left headlight modules, each of the modules having within a single housing a dipped-beam headlight and a fixed bend light source;
a steering wheel with a sensor adapted to provide information on a nature of a road traveled by the motor vehicle;
a controller adapted to create a sweeping effect by controlling the fixed bend light sources according to information from the steering wheel sensor,
in which each of the fixed bend light sources comprises a plurality of light-emitting diodes, and
in which the controller creates the sweeping effect
when the vehicle turns to the right by switching on the light-emitting diodes of the right headlight module in a pattern to provide light sources to produce a series of light beams of the right headlight module corresponding to the individual light-emitting diodes which light beams are increasingly inclined towards the right, and
when the vehicle turns to the left by switching on the light-emitting diodes of the left headlight module in a pattern to provide light sources to produce a series of light beams of the left headlight module corresponding to the individual light-emitting diodes which light beams are increasingly inclined towards the left, and
in which angular opening of the successive light beam increases in the direction of the turn of the vehicle.

* * * * *